US012771435B2

(12) United States Patent
Jia et al.

(10) Patent No.: US 12,771,435 B2
(45) Date of Patent: Oct. 20, 2026

(54) TRANSMIT BEAMFORMING ENHANCEMENT

(71) Applicant: HEWLETT PACKARD ENTERPRISE DEVELOPMENT LP, Spring, TX (US)

(72) Inventors: Xuguang Jia, Beijing (CN); Xiaoyang Fu, Beijing (CN); Yongchang Guo, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 91 days.

(21) Appl. No.: 18/780,762

(22) Filed: Jul. 23, 2024

(65) Prior Publication Data

US 2026/0031895 A1 Jan. 29, 2026

(51) Int. Cl.

*H04B 7/08* (2006.01)
*H04B 7/06* (2006.01)
*H04W 52/02* (2009.01)

(52) U.S. Cl.

CPC ......... *H04B 7/0897* (2013.01); *H04B 7/0695* (2013.01); *H04W 52/0248* (2013.01)

(58) Field of Classification Search

CPC ........................ H04W 52/0248; H04B 7/0695; H04B 7/0897
USPC ........................................................ 375/262
See application file for complete search history.

(56) References Cited

U.S. PATENT DOCUMENTS

| | | | | |
|---|---|---|---|---|
| 10,863,399 B2 * | 12/2020 | Li | ........................ | H04B 7/0408 |
| 2022/0116870 A1 * | 4/2022 | Cariou | .................. | H04W 76/15 |
| 2022/0408355 A1 * | 12/2022 | Shafin | .................. | H04B 17/336 |
| 2025/0159721 A1 * | 5/2025 | Shafin | .................. | H04W 74/04 |

FOREIGN PATENT DOCUMENTS

| | | | | |
|---|---|---|---|---|
| WO | WO-2024190715 A1 * | 9/2024 | ............ | H04W 76/15 |

* cited by examiner

*Primary Examiner* — Sam K Ahn
(74) *Attorney, Agent, or Firm* — Hewlett Packard Enterprise Patent Department

(57) ABSTRACT

A method for performing beamforming processes between an access point (AP) multi-link device (MLD) and a station (STA) MLD. The method comprises determining a first time interval for performing beamforming on a first link with an STA and a second time interval for performing beamforming on a second link with the STA. The method further comprises negotiating, with the STA, a first target wake time (TWT) service period on the first link based on the first time interval. The method further comprises negotiating, with the STA, a second TWT service period on the second link based on the second time interval and the first TWT service period. The method further comprises performing a first beamforming process on the first link during the first TWT service period. In addition, the method further comprises performing a second beamforming process on the second link during the second TWT service period.

19 Claims, 7 Drawing Sheets

TRANSMIT BEAMFORMING ENHANCEMENT

BACKGROUND

Generally, access point (AP) antennas transmit signals evenly in all directions. Transmit (TX) beamforming is a technique used to improve the efficiency and performance of wireless communication by directing the transmission of signals toward a specific receiving device, for example a station (STA), rather than broadcasting the signal in all directions. This focused transmission can improve signal strength, extend the signal range, reduce interference, and increase network efficiency.

Multi-link operation (MLO) is a feature introduced in Wi-Fi 7. MLO allows a non-AP multi-link device (MLD) to discover, authenticate, associate, and establish multiple links with an AP MLD. Once the MLD setup procedure is complete, each link facilitates channel access and frame exchanges between the non-AP MLD and the AP MLD.

BRIEF DESCRIPTION OF THE DRAWINGS

Implementations of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with reference to the following figures.

DETAILED DESCRIPTION

Figure 1:
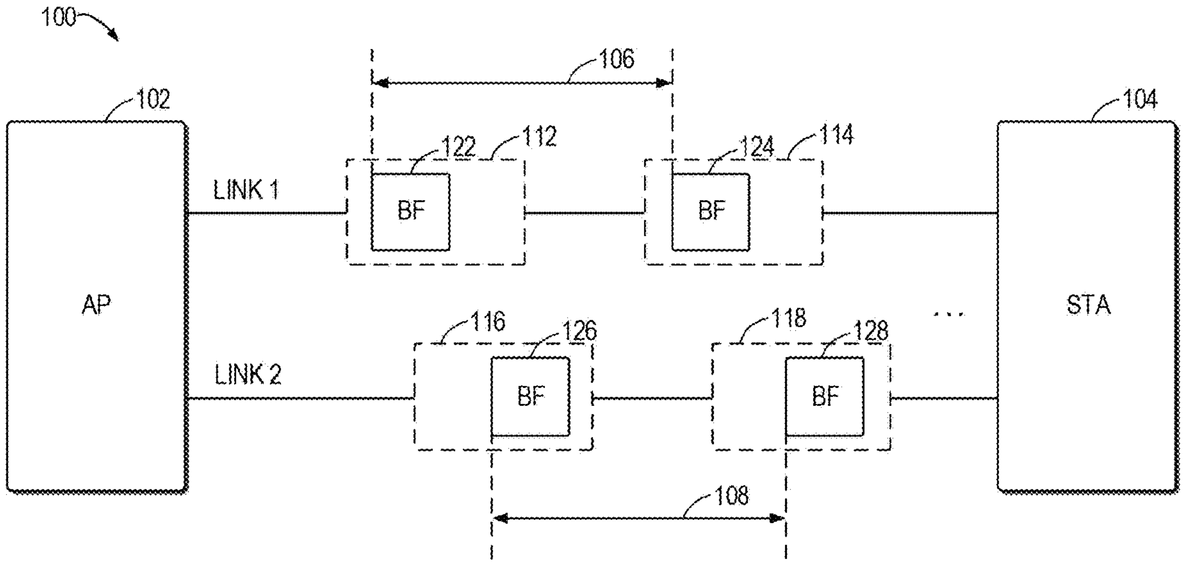
FIG. 1 illustrates an example environment in which example implementations of the present disclosure may be implemented.

In some traditional schemes, the transmission beamforming process still primarily targets individual link performance. This implies that the beamforming interval and trigger conditions for each link are not controlled or well-scheduled for multi-link deployment. In these traditional schemes, after performing a beamforming process on a certain link, the STA may send a power save signal and enter a power-saving mode. After the STA enters the power-saving mode, the AP cannot perform subsequent beamforming processes on other links of the STA, which makes it impossible for the AP to obtain the beamforming results on the other links. Since the AP is unable to promptly assess the status of each link, it may struggle to identify the most appropriate link among several options for data transmission. This may lead to unfairness during scheduling, which may cause jitter in the traffic and reduce the network performance. Furthermore, if the STA cannot awaken from the power-saving mode timely, the received beamforming result may be expired. This may reduce the network performance as well.

Furthermore, the AP may receive channel feedback information sounding frames as the beamforming results to gather channel state information (CSI) from the STAs. Wi-Fi 7 supports much larger bandwidths (e.g., 320 MHz) compared to previous standards. The increased bandwidth means that more data is required to describe the channel state accurately, even if the data is compressed. Because the beamforming processes on multiple links are not well-scheduled, these beamforming processes may be triggered at the same time. Therefore, when these beamforming processes are performed simultaneously, the transmission of normal traffic may be affected.

Therefore, implementations of the present disclosure provide a scheme of performing beamforming processes between an AP MLD and an STA MLD. The AP may transmit data to the STA via multiple MLD links. In order to obtain beamforming results on each of the multiple MLD links, the scheme may employ the target wake time (TWT) feature introduced in Wi-Fi 6 to establish TWT service periods on each of the multiple MLD links. In the implementations of the present disclosure, the AP MLD may execute beamforming processes across multiple MLD links during these TWT service periods.

Specifically, the AP may determine a time interval for beamforming on a first link with the STA and another time interval for a second link. Subsequently, the AP may negotiate a TWT service period for the first link based on its specific time interval, and another service period for the second link based on its time interval and the TWT service period for the first link. After establishing TWT service periods with the STA MLD, the AP may perform a beamforming process on the first link during the first TWT service period and perform another beamforming process on the second link during the second service period.

In this way, the STA may awaken from the power-saving mode during the TWT service periods, allowing the AP to timely acquire the beamforming results from the STA through the multiple MLD links. Then, the AP may determine a link with the best performance to transmit data. Therefore, the performance of the network can be improved.

FIG. 1 illustrates an example environment 100 in which example implementations of the present disclosure may be implemented. As shown in FIG. 1, the environment 100 comprises an AP 102, an STA 104, and two MLD links (i.e., link 1 and link 2) between the AP 102 and the STA 104. The AP 102 may send a Multi-User Request to Send (MU-RTS) frame to the STA 104 to initiate the process. After sending the MU-RTS, the STA 104 may respond with a Clear to Send (CTS) frame, indicating that it is ready to participate in the beamforming process. Then, the AP 102 may send an Extremely High Throughput (EHT) Null Data Packet (NDP) announcement frame to inform the STA 104 that an NDP is about to be sent for channel sounding. After a short interval, the AP 102 may send the EHT sounding NDP. This packet may be used by the STA 104 to measure the channel characteristics such as path loss, multipath effects, etc. Then, the STA 104 may send a beamforming result containing the CSI. The AP 102 may use the beamforming result to adjust its transmission parameters for optimal beamforming. Finally, a Quality of Service (QOS) Null frame may be sent to conclude the beamforming process.

In the environment 100, as the STA 104 moves within the coverage area of the AP 102, its relative position with respect to the AP 102 may be changed. This movement may change the path that the signal travels, affecting factors like path loss, phase, and amplitude of the received signal. Therefore, the AP 102 may determine a time interval for beamforming on the link 1 and another time interval for beamforming on the link 2 to update the beamforming result from the STA 104 through the link 1 and the link 2 periodically.

In the environment 100, in order to avoid the STA 104 entering power-saving mode when the beamforming results need to be updated or beamforming processes need to be performed on another link, the AP 102 may negotiate with the STA 104 a TWT service period 112 and a TWT service period 114 for performing beamforming processes through the link 1. During the TWT service periods 112 and 114, the STA 104 is not in power-saving mode. In addition, in order to ensure that the beamforming result can be updated at the specific time interval, the trigger time and the duration of the TWT service periods 112 and 114 may be determined based on the update time interval for beamforming on the link 1. After establishing the TWT service periods 112 and 114, the AP 102 may perform a beamforming process 122 during the TWT service period 112, and perform a beamforming process 124 during the TWT service period 114, where the time interval 106 between the beamforming process 122 and the beamforming process 124 may be the time interval for beamforming on the link 1.

In the environment 100, the AP 102 may also negotiate with the STA 104 a TWT service period 116 and a TWT service period 118 for performing beamforming processes through the link 2. The trigger time and the duration of the TWT service periods 116 and 118 may be determined based on the time interval for beamforming on the link 2. After establishing the TWT service periods 116 and 118, the AP 102 may perform a beamforming process 126 during the TWT service period 116, and perform a beamforming process 128 during the TWT service period 118, where the time interval 108 between the beamforming process 126 and the beamforming process 128 may be the update time interval for beamforming on the link 2. In addition, in order to reduce the possibility of the beamforming processes 122 and 126 (or the beamforming processes 124 and 128) being performed simultaneously, the TWT service periods 116 and 118 may be determined by referring to the TWT service periods 112 and 114.

In this way, the beamforming processes on the link 1 and the link 2 can be performed during the specified time period. Therefore, the beamforming results from both of the link 1 and the link 2 can be obtained, and the beamforming results can be updated in a timely manner. Thus, the performance of the network can be improved.

Figure 2:
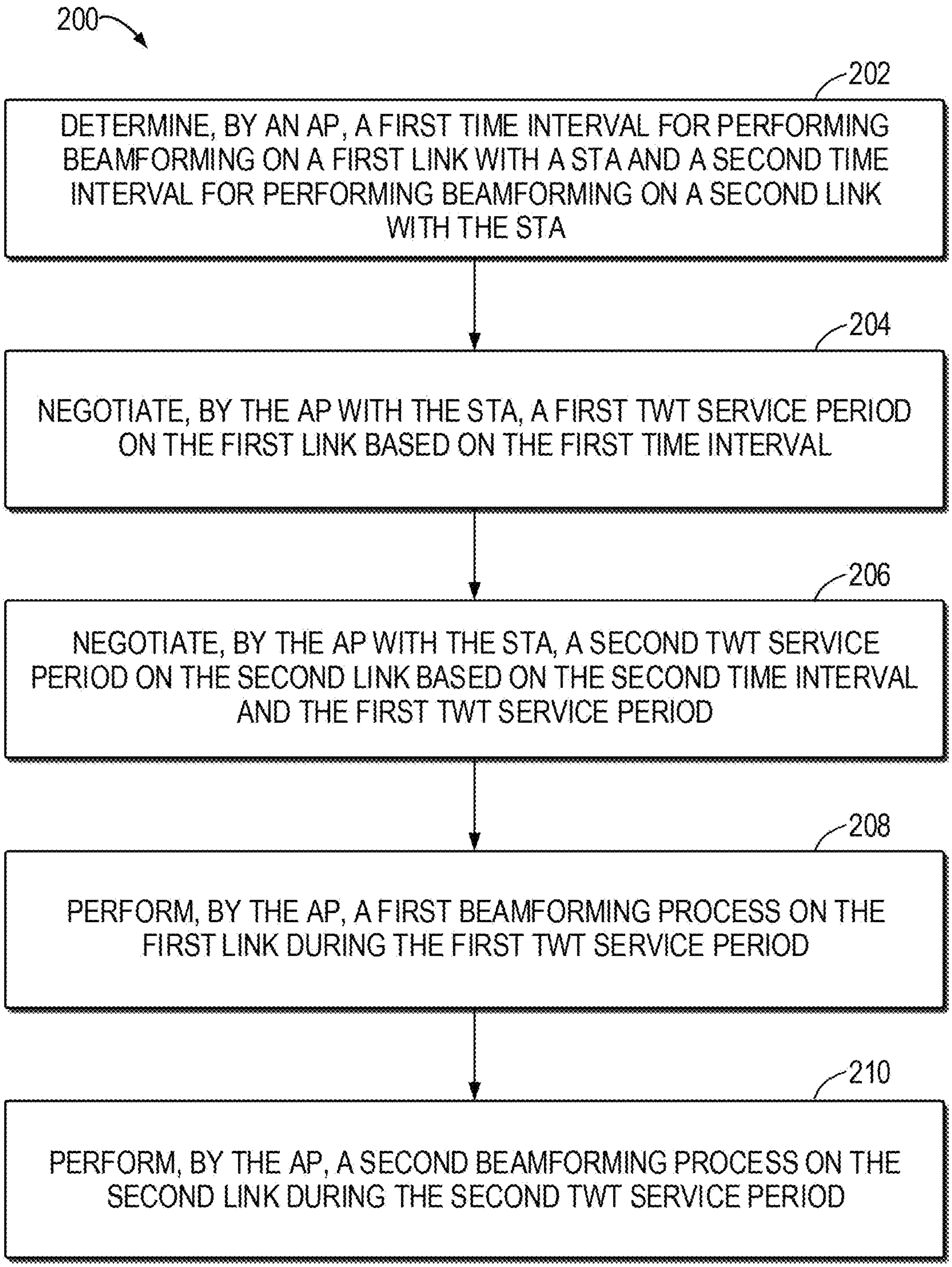
FIG. 2 shows a flow chart illustrating a method of performing beamforming processes between an AP MLD and an STA MLD according to the implementations of the present disclosure.

FIG. 2 shows a flow chart illustrating a method 200 of performing beamforming processes between an AP MLD and an STA MLD according to the implementations of the present disclosure. The method 200 may be implemented by, for example, the AP 102 in FIG. 1. As shown in FIG. 2, at block 202, an AP may determine a first time interval for performing beamforming on a first link with an STA and a second time interval for performing beamforming on a second link with the STA. For example, in the environment 100, as shown in FIG. 1, the AP 102 may determine a time interval for performing beamforming on the link 1. The beamforming result on the link 1 should be updated at the time interval to ensure the beamforming result is effective. Furthermore, the AP 102 may also determine another time interval for performing beamforming on the link 2.

At block 204, the AP may negotiate with the STA a first TWT service period on the first link based on the first time interval. For example, in the environment 100, as shown in FIG. 1, the AP 102 may negotiate with the STA 104 and establish the TWT service period 112. The STA 104 may awaken from the power-saving mode and respond the MU-RTS frame transmitted by the AP 102 on the link 1 during the TWT service period 112. The TWT service period 112 may be determined based on the time interval for beamforming on the link 1 to ensure that the beamforming processes on the link 1 can be performed at the specified time interval.

At block 206, the AP may negotiate with the STA a second TWT service period on the second link based on the second time interval and the first TWT service period. For example, in the environment 100, as shown in FIG. 1, the AP 102 may further negotiate with the STA 104 and establish the TWT service period 116. The STA 104 may awaken from the power-saving mode and respond the MU-RTS frame transmitted by the AP 102 on the link 2 during the TWT service period 116. The TWT service period 116 may be determined based on the time interval for beamforming on the link 2 and the TWT service period 112 to ensure that the beamforming processes on the link 2 can be performed at the specified time interval, and to reduce the possibility of the beamforming processes on the link 1 and the link 2 being performed simultaneously.

At block 208, the AP may perform a first beamforming process on the first link during the first TWT service period. For example, in the environment 100, as shown in FIG. 1, the AP 102 may perform the beamforming process 122 on the link 1 during the TWT service period 112. After obtaining a result of the beamforming process 122, the AP 102 may transmit traffic, during the TWT service period 112, to the STA 104 through the link 1 by utilizing the result of the beamforming process 122.

At block 210, the AP may perform a second beamforming process on the second link during the second TWT service period. For example, in the environment 100, as shown in FIG. 1, the AP 102 may perform the beamforming process 126 on the link 2 during the TWT service period 116. Because the TWT service period 116 is different from the TWT service period 112, the beamforming process 122 and the beamforming process 126 may be performed un-simultaneously.

In this way, the beamforming processes on the first link and the second link can be performed during the specified TWT service period. Therefore, the beamforming results from both the first link and the second link can be obtained. Therefore, the AP may determine a link with the best performance to transmit data. In addition, the beamforming results on the links can be updated in a timely manner. Thus, the performance of the network can be improved.

In some implementations, in order to further reduce the possibility of beamforming processes being performed simultaneously, the AP may determine a trigger time and a duration of a TWT service period on the first link. Then, the AP may determine a trigger time and a duration of another TWT service period on the second link to ensure that these TWT service periods do not overlap.

For example, in a case of enhanced multi-link single-radio (EMLSR), The STA may have one or more dedicated chains listening to each link, allowing the AP to establish TWT service periods with each link sequentially. When the STA receives a trigger frame on one link, it will allocate all chains to that link. Before or after the traffic transmission is finished, the AP may initiate an individual TWT (I-TWT) setup, or the STA may join a broadcast TWT (B-TWT) or restricted TWT (R-TWT) schedule. Subsequently, each link may operate within its respective TWT service periods.

In a case of multi-link multi-radio (MLMR), all links may operate independently, and the TWT sessions may be set up separately. The TWT service periods may be scheduled to avoid starting simultaneously and do not overlap to prevent interference with normal traffic transmission. When a TWT service period is triggered, the STA may wake up, and the AP may perform a beamforming process before or after the traffic transmission.

Figure 3:
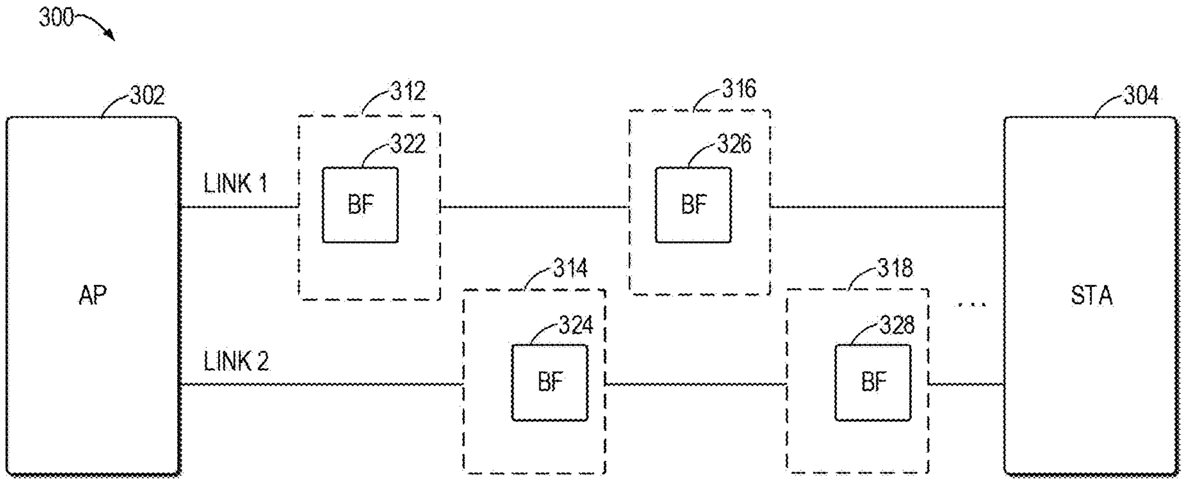
FIG. 3 shows a schematic diagram illustrating an example of establishing non-overlapping TWT service periods on two MLD links according to the implementations of the present disclosure.

FIG. 3 shows a schematic diagram illustrating an example 300 of establishing non-overlapping TWT service periods on two MLD links according to the implementations of the present disclosure. As shown in FIG. 3, the example 300 comprises an AP 302, an STA 304, and two MLD links (i.e., a link 1 and a link 2) between the AP 302 and the STA 304. The AP 302 may negotiate with the STA 304 and establish a TWT service period 312 on the link 1. When negotiating a TWT service period 314 on the link 2 with the STA 304, the AP 302 may determine an end time of the TWT service period 312 based on the trigger time and the duration of the TWT service period 312. Then, the AP 302 may determine a time after the end time of the TWT service period 312 as a trigger time of the TWT service period 314. Furthermore, the AP 302 may determine a duration of the TWT service period 314 based on the time interval for beamforming on the link 2.

When negotiating a TWT service period 316 on the link 1 with the STA 304, the AP 302 may determine an end time of the TWT service period 314 based on the trigger time and the duration of the TWT service period 314. Then, the AP 302 may determine a time after the end time of the TWT service period 314 as a trigger time of the TWT service period 316. A TWT service period 318 on the link 2 may be determined in a similar manner to ensure that the TWT service period 318 does not overlap with the TWT service period 316. Then, the AP 302 may perform a beamforming process 322 on the link 1 within the TWT service period 312, a beamforming process 324 on the link 2 within the TWT service period 314, a beamforming process 326 on the link 1 within the TWT service period 316, and a beamforming process 328 on the link 2 within the TWT service period 318. In this way, these beamforming processes can be performed un-simultaneously, thereby reducing the impact of the beamforming processes on the traffic transmission.

The TWT service period serves as a common time frame for individual, broadcast, and restricted TWT sessions, making it well-suited for the periodic TX beamforming procedure. In the example 300, the time intervals for beamforming on the link 1 and the link 2 may be similar, for example, both of them may be 100 ms. In some implementations, the AP may treat the time intervals for all MLD links as a constant value C (e.g., 100 ms). The trigger time $TWT_{trigger\_time\_link\ i}$ of a TWT service period on the $link_i$, which may also be considered as a time offset, may be determined by Equation (1) as below:

$$TWT_{trigger\_time\_link\ i} = i \cdot \frac{C}{L} \tag{1}$$

Where L denotes the number of links for the STA MLD.

In the example 300, the constant value of the time interval may be 100 ms, the number of links for the STA 304 is two. Thus, the trigger time of the TWT service period 314 may be 50 ms. If the example 300 further comprises a link 3 between the AP 302 and the STA 304, the trigger time of the TWT service period 314 may be 33 ms, and the trigger time of the TWT service period on the link 3 may be 66 ms.

In this way, it can be ensured that the TWT service periods on multiple links do not overlap. Therefore, the beamforming processes on multiple links can be performed un-simultaneously. Thus, the impact of the beamforming processes on the traffic transmission can be reduced.

As described above, the size of the frames for beamforming in Wi-Fi 7 may be larger than the frames in the previous standards, such that the transmission of the beamforming frames may cost time and air resources. In some implementations, in order to reduce the number of beamforming processes, the AP may determine whether a change of position of the STA meets a predetermined condition based on a result of a beamforming process performed on one of the multiple links. If the change of position of the STA meets the predetermined condition, the beamforming processes on the remaining links may be skipped. If the change of position of the STA does not meet the predetermined condition, the beamforming processes on the remaining links may be performed.

Typically, the AP may obtain the feedback information of TX beamforming processes instantaneously. Furthermore, because the factors such as the position of the device or interference signals are varying, beamforming processes cannot be skipped. However, in the MLD case, there are some relationships between the multiple links. In an MLD device, because the multiple radios are located in a single enclosure, they have a same position. Thus, when the AP determines that the position of one of the radios is not changed, the AP may determine the positions of the remaining radios are not changed as well. Then, the AP may skip the beamforming processes on the remaining links and reuse the respective beamforming results obtained in a previous period.

Figure 4:
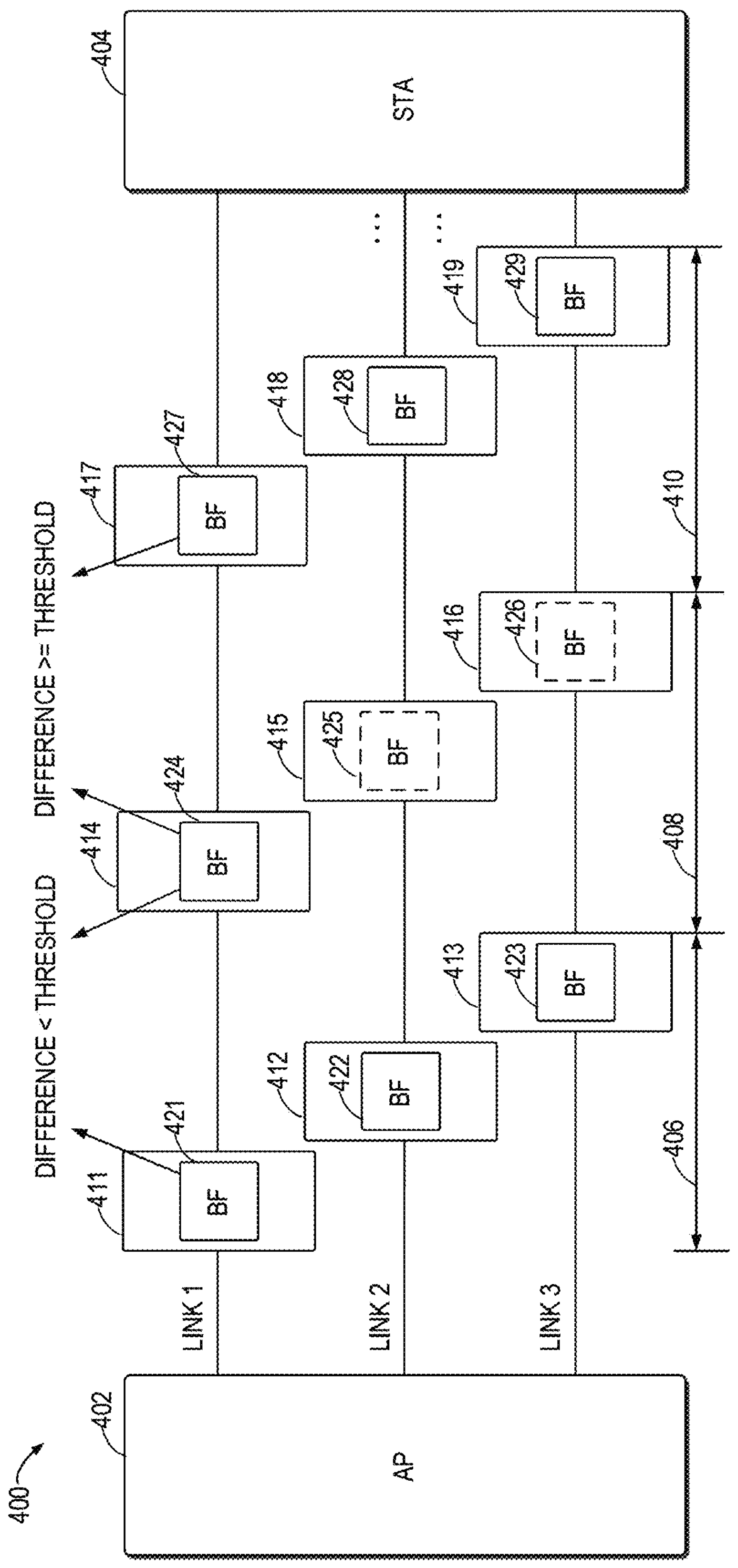
FIG. 4 shows a schematic diagram illustrating an example of skipping beamforming processes on some MLD links based on a result of a beamforming process performed on one MLD link according to the implementations of the present disclosure.

FIG. 4 shows a schematic diagram illustrating an example 400 of skipping beamforming processes on some MLD links based on a result of a beamforming process performed on one MLD link according to the implementations of the present disclosure. As shown in FIG. 4, the example 400 comprises an AP 402, an STA 404 and three MLD links (i.e., a link 1, a link 2, and a link 3) between the AP 402 and the STA 404. During a period 406, TWT service periods 411, 412, and 413 may be established on the links 1, 2, and 3. Beamforming processes 421, 422, and 423 are performed within the TWT service periods 411, 412, and 413, and the AP 402 may obtain the results of these beamforming processes. During a period 408, TWT service periods 414, 415 and 416 may be established on the links 1, 2, and 3.

After obtaining a result of beamforming process 424 performed on the link 1 within the TWT service period 414, the AP 402 may determine a difference between the result of the beamforming process 421 and the result of the beamforming process 424. In the example 400, the difference is less than a predetermined threshold value, thereby the AP 402 may determine that the position of the STA 404 is not changed. Then, the AP 402 may skip the beamforming process 425 to be performed on the link 2 and the beamforming process 426 to be performed on the link 3. Furthermore, the AP 402 may reuse the result of the beamforming process 422 as a result of the beamforming process 425, and reuse the result of the beamforming process 423 as a result of the beamforming process 426.

As shown in FIG. 4, during a period 410, TWT service periods 417, 418, and 419 may be established on the links 1, 2, and 3. A beamforming process 427 on the link 1 may be performed within the TWT service period 417. After obtaining a result of the beamforming process 427, the AP 402 may determine a difference between the result of the beamforming process 424 and the result of the beamforming process 427. In the example 400, the difference is greater than or equal to the predetermined threshold value, thereby the AP 402 may determine that the position of the STA 404 is changed. Thus, a beamforming process 428 on the link 2 and a beamforming process 429 on the link 3 cannot be skipped. In this way, the number of beamforming processes can be reduced, thereby the bandwidth and air resources for beamforming can be reduced.

In some implementations, the result of the beamforming processes may be represented as a H·Q matrix. H denotes a channel state matrix, describing channel states such as attenuations, interferences, multipath effects, etc. Q denotes a beamforming matrix, weighting the signals to form the optimal beam. The AP 402 may calculate a matrix difference between the H·Q matrix for the beamforming process 421 and the H·Q matrix for the beamforming process 424. Then, the AP 402 may calculate a matrix norm of the matrix difference and compare the matrix norm with the predetermined threshold value. In this way, the difference between the beamforming results can be measured accurately.

In some implementations, if the AP 402 determines that the position of the STA 404 is not changed after obtaining the result of the beamforming process 424, the negotiation of the TWT service periods 415 on the link 2 and the negotiation of the TWT service period 416 on the link 3 may be skipped. In this way, unnecessary negotiations can be reduced, thereby the network resources can be saved. Furthermore, eliminating unnecessary negotiations can reduce the latency, providing a smoother and faster user experience.

Figure 5:
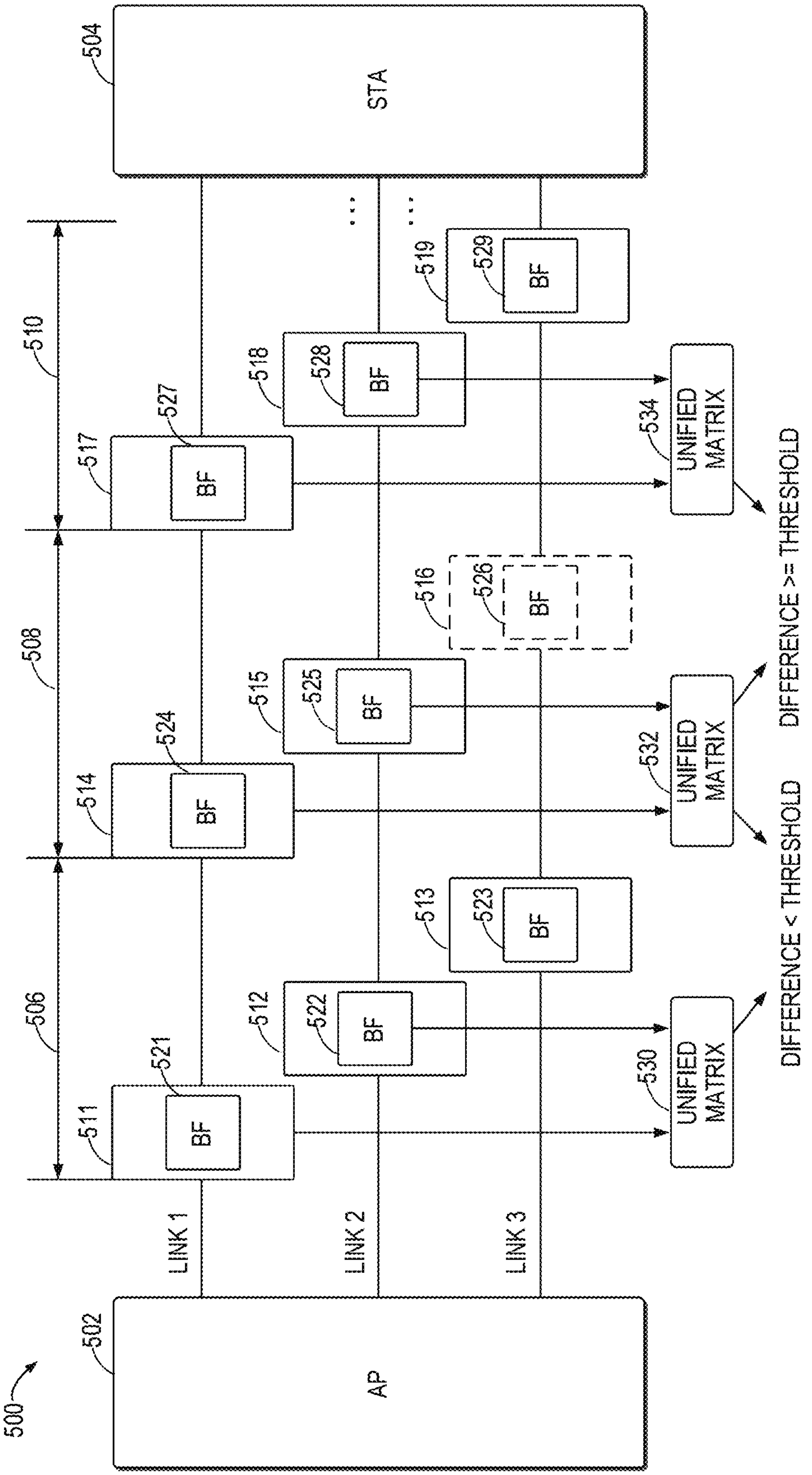
FIG. 5 shows a schematic diagram illustrating an example of skipping a beamforming process on an MLD link based on the results of multiple beamforming processes performed on two MLD links according to the implementations of the present disclosure.

In some implementations, in order to improve the accuracy of determining that the position of the STA is not changed, the AP may determine that a change of position of the STA meets a predetermined condition based on multiple beamforming results on multiple links. Then, the AP may skip beamforming processes on the remaining links. FIG. 5 shows a schematic diagram illustrating an example 500 of skipping a beamforming process on an MLD link based on results of multiple beamforming processes performed on two MLD links according to the implementations of the present disclosure. As shown in FIG. 5, the example 500 comprises an AP 502, an STA 504 and three MLD links (i.e., a link 1, a link 2, and a link 3) between the AP 502 and the STA 504. During a period 506, TWT service periods 511, 512, and 513 may be established on the links 1, 2, and 3. Beamforming processes 521, 522 and 523 are performed within the TWT service periods 511, 512 and 513, and the AP 402 may obtain the results of these beamforming processes. During a period 508, TWT service periods 514 and 515 may be established on the links 1 and 2.

After obtaining a result of beamforming process 524 performed on the link 1 within the TWT service period 514 and a result of beamforming process 525 performed on the link 2 within the TWT service period 515, the AP 502 may determine whether the position of STA 504 has changed by comparing the results of the beamforming processes 524 and 525 with the results of the beamforming processes 521 and 522. In the example 500, in order to compare these beamforming results, the AP 502 may generate a unified matrix 530 based on the results (e.g., the H·Q matrix) of the beamforming processes 521 and 522. The unified matrix 530 may be represented by Equation (2) as below:

$$\begin{bmatrix} H\cdot Q_1 & \text{Link 1} \\ H\cdot Q_2 & \text{Link 2} \end{bmatrix} \qquad (2)$$

Where $H \cdot Q_1$ denotes the result of the beamforming process 521, and $H \cdot Q_2$ denotes the result of the beamforming process 522.

Furthermore, the AP 502 may generate a unified matrix 532 based on the results of the beamforming processes 524 and 525. Then, the AP 502 may determine a matrix difference between the unified matrix 530 and the unified matrix 532 and calculate a matrix norm of the matrix difference. In the example 500, the matrix norm is less than the predetermined threshold value, thereby the AP 502 may determine that the position of the STA 504 is not changed. Thus, the negotiation of the TWT service period 516 and the beamforming process 526 to be performed on the link 3 may be skipped.

As shown in FIG. 5, during a period 510, TWT service periods 517 and 518 may be established on the links 1 and 2. A beamforming process 527 on the link 1 may be performed within the TWT service period 517, and a beamforming process 528 on the link 2 may be performed within the TWT service period 518. After obtaining the results of the beamforming processes 527 and 528, the AP 502 may determine whether the position of STA 504 has changed by comparing the results of the beamforming processes 527 and 528 with the results of the beamforming processes 524 and 525. In the example 500, the AP 502 may generate a unified matrix 534 based on the results of the beamforming processes 527 and 528. Then, the AP 502 may determine a difference between the unified matrix 534 and the unified matrix 532. In the example 500, the AP 502 may determine that the position of the STA 504 has changed because the difference between the unified matrix 534 and the unified matrix 532 is greater than or equal to the predetermined threshold value. Therefore, a TWT service period 519 on the link 3 may be established and a beamforming process 529 on the link 3 may be performed within the TWT service period 519.

In this way, multiple beamforming results on multiple links are used to determine that the position of the STA 504 is not changed, thereby the accuracy of the determination can be improved.

A scheduling model may be derived from the implementations of the present disclosure. Various factors may be used to describe the MLD beamforming among links, for example, the number of beamforming processes, the beamforming period, the number of columns in a CSI matrix, the number of rows in a CSI matrix, and the number of subcarriers, etc. To simplify the beamforming processes in the MLD-level, the scheduling model may focus on the number of beamforming processes and the beamforming period. These factors are crucial for ensuring fair MLD beamforming from the perspective of a unified timeline across all links.

As described above, the TWT service period serves as a common time frame for individual, broadcast, and restricted TWT sessions, making it well-suited for the periodic TX beamforming procedure. The parameters of the TWT service periods for the link I should follow the Equations (3) and (4) as below:

$$TWT_{interval\_link\ i} = BF_{period\_link\ i} = C \tag{3}$$

$$TWT_{trigger\_time\_link\ i} = BF_{offset\_link\ i} = i \cdot \frac{C}{L} \tag{4}$$

Where $TWT_{interval\_link\ i}$ denotes the interval of TWT service periods on the $link_i$, $BF_{period\_link\ i}$ denotes the beamforming period on the $link_i$, $TWT_{trigger\_time\_link\ i}$ denotes the trigger time of the TWT service period on the $link_i$, $BF_{offset\_link\ i}$ denotes a time offset of the beamforming process on the $link_i$, C denotes a constant value referring to the target beacon transmission time (TBTT) time, and L denotes the number of links for the STA MLD.

During a periodic TX beamforming procedure, the scheduling model may obtain the channel feedback information $H \cdot Q_i$ on the $link_i$ in certain time. The beamforming results for all links may be represented as a matrix $H \cdot Q_{MLD}$ by Equation (5) as below:

$$H \cdot Q_{MLD} = \begin{bmatrix} H \cdot Q_1 & \text{Link1} \\ \cdots & \cdots \\ H \cdot Q_i & \text{Link } i \\ \cdots & \cdots \\ H \cdot Q_L & \text{Link } L \end{bmatrix} \tag{5}$$

To simplify the calculation, it is assumed that the beamforming results for different links can be described uniformly. Therefore, the size of the matrix H·Q; may be represented as M×N, where M denotes the number of antennas and N denotes the number of symbols. Then, the size of the matrix $H \cdot Q_{MLD}$ may be represented as K×N, where K denotes the total number of antennas across all links.

Because the matrix $H \cdot Q_i$ and the matrix $H \cdot Q_{MLD}$ are time related, for a matrix H·Q(t), where $0 \le t \le T_{max}$, the increment of the matrix H·Q(t) may be represented by Equation (6) as below:

$$\Delta(H \cdot Q)(t) = (H \cdot Q)(t) - (H \cdot Q)(t - dt) \tag{6}$$

Where dt denotes an increment in time.

The scheduling model may use difference matrix $\Delta(H \cdot Q_i)$ or $\Delta(H \cdot Q_{MLD})$ to represent the difference between a current beamforming result and a previous beamforming result (or a beamforming result before a certain pre-defined time). If the difference matrix $\Delta(H \cdot Q_i)$ or $\Delta(H \cdot Q_{MLD})$ meets a predetermined condition, it indicates that there is little to no difference between the current beamforming result and the previous beamforming result. Therefore, the scheduling model may allow the AP MLD to skip the beamforming processes on other links.

For example, a threshold value for the $link_i$ may be defined as $Threshold_{\Delta H \cdot Q_i}$, and a threshold value for the MLD may be defined as $Threshold_{\Delta(H \cdot Q_{MLD})}$. The scheduling model may determine the difference between the beamforming results by calculating the matrix norm $\|\Delta(H \cdot Q)\|_F$ (F≥1). If $\|\Delta(H \cdot Q)\|_1 > Threshold_{\Delta(H \cdot Q_i)}$, the beamforming processes on the remaining links may be performed. Otherwise, the beamforming processes on the remaining links may be skipped.

Figure 6:
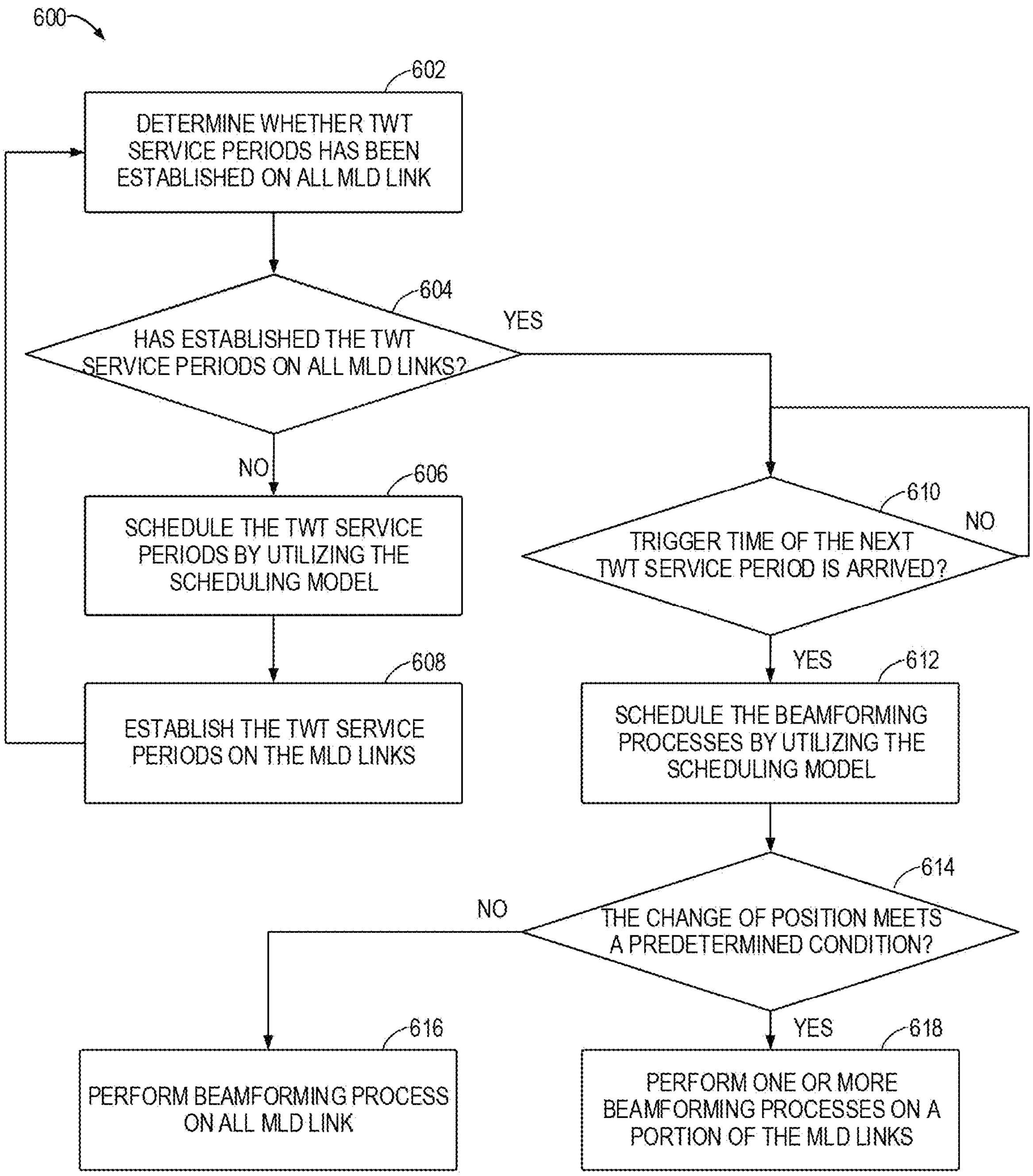
FIG. 6 shows a flow chart illustrating an example process of performing beamforming processes by utilizing a scheduling model according to the implementations of the present disclosure.

FIG. 6 shows a flow chart illustrating an example process 600 of performing beamforming processes by utilizing a scheduling model according to the implementations of the present disclosure. As shown in FIG. 6, at block 602, an AP may determine whether TWT service periods have been established on all MLD links, excluding the service periods to be skipped. At block 604, if the AP has not established TWT service periods on all MLD links, the process 600 may proceed to block 606.

At block 606, the AP may schedule the TWT service periods by utilizing the scheduling model. For example, the AP may determine a duration of the TWT service periods. Furthermore, the AP may determine the number of MLD links between the AP and the STA. Then, the AP may determine a time offset for the TWT service periods. Therefore, the AP may determine a trigger time for a TWT service period based on the link number and the time offset. In addition, if the AP determines that the position of the STA is not changed based on a current beamforming result and a previous beamforming result on a link, the TWT service periods on the remaining links may be skipped.

At block 608, the AP may establish the TWT service periods on the MLD links. For example, the AP may negotiate with the STA and establish the TWT service periods based on the trigger time and the duration determined at block 606. Furthermore, the TWT service periods to be skipped may not be established at block 608.

Return back to block 604, if the TWT service periods have been established on all MLD links, the process 600 may proceed to block 610. At block 610, the AP may determine whether the trigger time of the next TWT service period arrives. If the trigger time of the next TWT service period arrives, the process 600 may proceed to block 612.

At block 612, the AP may schedule the beamforming processes by utilizing the scheduling model. For example, in some implementations, the AP may determine whether a change of position of the STA meets a predetermined condition based on a current beamforming result and a previous beamforming result on one link. If a difference between the current beamforming result and the previous beamforming result is less than a predetermined threshold value, it indicates that the position of the STA is almost unchanged. Thus, the AP may skip the beamforming processes on other links. In some implementation, the AP may determine whether a change of position of the STA meets a predetermined condition based on current beamforming results and previous beamforming results on multiple links. The AP may generate a unified matrix for the current beamforming results and a unified matrix for the previous beamforming results. If a difference between these two unified matrixes is less than a predetermined threshold value, it indicates that the position of the STA is almost unchanged. Thus, the AP may skip the beamforming processes on the remaining links.

At block 614, if the AP determines that the change of position of the STA does not meet the predetermined condition, the process 600 may proceed to block 616. At block 616, the AP may perform beamforming processes on all MLD links. Return back to block 614, if the AP determines that the change of position of the STA meets the predetermined condition, the process 600 may proceed to block 618. At block 618, the AP may perform one or more beamforming processes on a portion of the MLD links.

By utilizing the scheduling model, the beamforming results from all MLD links can be obtained. Therefore, the AP may determine a link with the best performance to transmit data. Furthermore, the beamforming results on the links can be updated in a timely manner. In addition, the number of the TWT service periods and the number of beamforming processes can be reduced, thereby the bandwidth, the channel utilization, the times of switching from a link to another link, and network resources can be reduced. Thus, the network performance can be improved.

Figure 7:
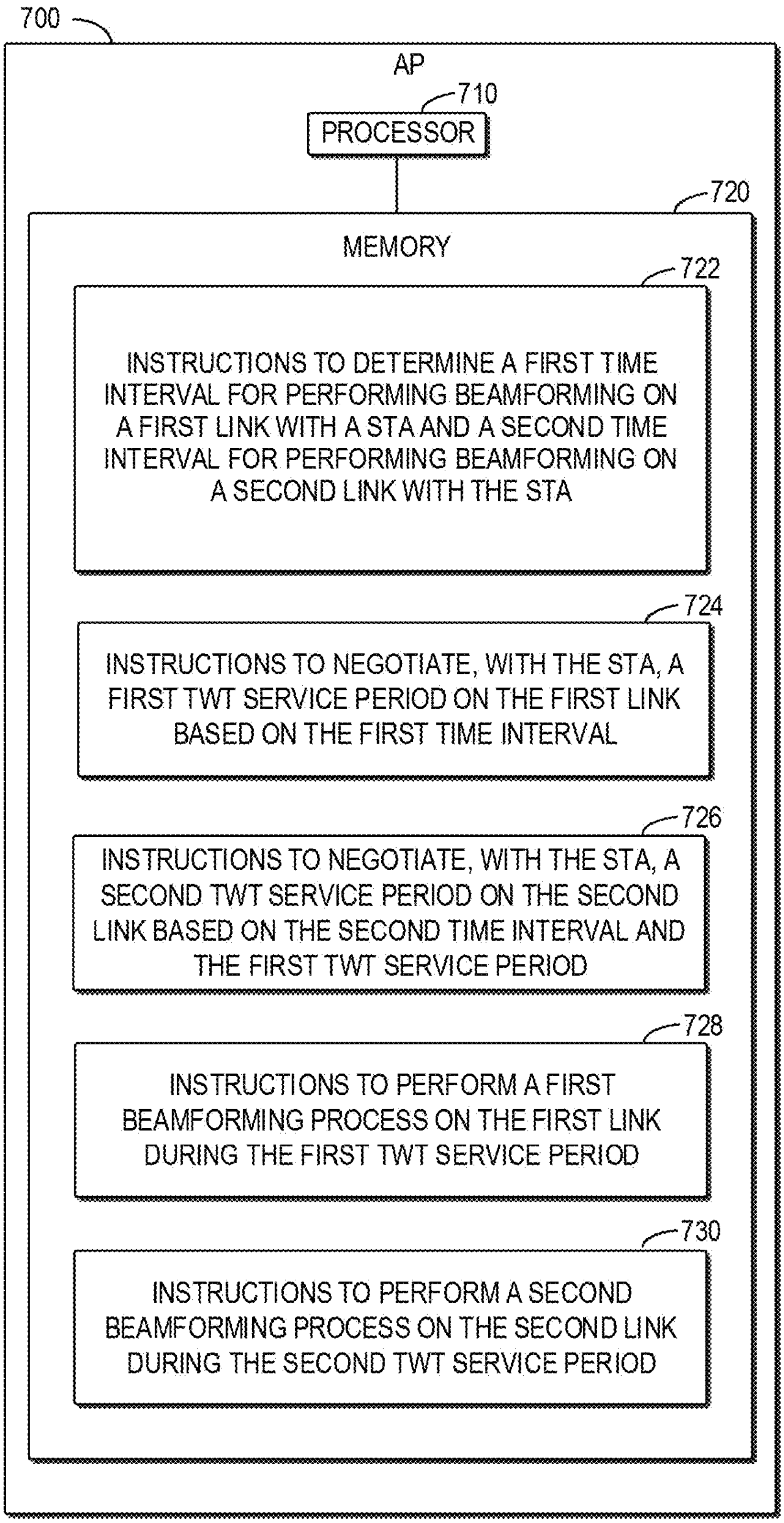
FIG. 7 shows a diagram illustrating an example AP according to the implementations of the present disclosure.

FIG. 7 shows a diagram illustrating an example AP 700 according to the implementations of the present disclosure. As shown in FIG. 7, the AP 700 comprises at least one processor 710, and a memory 720 coupled to the at least one processor 710. The memory 720 stores instructions 722, 724, 726, and 728 to cause the processor 710 to perform actions according to example implementations of the present disclosure.

As shown in FIG. 7, the memory 720 stores instructions 722 to determine a first time interval for performing beamforming on a first link with an STA and a second time interval for performing beamforming on a second link with the STA. The memory 720 further stores instructions 724 to negotiate, with the STA, a first TWT service period on the first link based on the first time interval. The memory 720 further stores instructions 726 to negotiate, with the STA, a second TWT service period on the second link based on the second time interval and the first TWT service period. The memory 720 further stores instructions 728 to perform a first beamforming process on the first link during the first TWT service period. In addition, the memory 720 further stores instructions 728 to perform a second beamforming process on the second link during the second TWT service period.

The stored instructions and the functions that the instructions may perform can be understood with reference to implementations as described above. For brevity, the details of instructions 722, 724, 726, and 728 will not be discussed herein.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order or that all illustrated operations be performed to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method comprising:

determining, by an access point (AP), a first time interval for performing beamforming on a first link with a station (STA) and a second time interval for performing beamforming on a second link with the STA;

negotiating, by the AP with the STA, a first target wake time (TWT) service period on the first link based on the first time interval;

negotiating, by the AP with the STA, a second TWT service period on the second link based on the second time interval and the first TWT service period;

performing, by the AP, a first beamforming process on the first link during the first TWT service period; and performing, by the AP, a second beamforming process on the second link during the second TWT service period.

2. The method according to claim 1, wherein negotiating, by the AP with the STA, the second TWT service period on the second link based on the second time interval and the first TWT service period comprises:

determining a first trigger time and a first duration of the first TWT service period; and determining a second trigger time and a second duration of the second TWT service period based on the first trigger time, the first duration and the second time interval, wherein the second TWT service period does not overlap with the first TWT service period.

3. The method according to claim 2, wherein the first time interval equals to the second time interval, the first duration is less than the first time interval and the second time interval, and determining the second trigger time and the second duration of the second TWT service period based on the first trigger time, the first duration and the second time interval comprises:

obtaining a number of links for the STA;

determining a time offset based on the number of links and the second time interval;

determining the second trigger time based on the first trigger time and the time offset; and determining the second duration of the second TWT service period based on the second time interval.

4. The method according to claim 1, further comprising:

determining that a change of position of the STA meets a predetermined condition based on a first beamforming result of the first beamforming process; and skipping the second beamforming process on the second link.

5. The method according to claim 4, wherein performing, by the AP, the second beamforming process on the second link during the second TWT service period comprises:

determining that the change of position of the STA does not meet the predetermined condition based on the first beamforming result of the first beamforming process; and performing the second beamforming process on the second link during the second TWT service period.

6. The method according to claim 4, wherein determining that the change of position of the STA meets the predetermined condition based on the first beamforming result of the first beamforming process comprises:

obtaining a third beamforming result of a previous beamforming process on the first link;

determining a difference between the first beamforming result and the third beamforming result; and determining that the change of position of the STA meets the predetermined condition in response to the difference being less than a threshold value.

7. The method according to claim 6, wherein the first beamforming result is a first matrix, the third beamforming result is a third matrix, each of the first matrix and the third matrix is generated based on a channel state matrix indicating channel states and a beamforming matrix indicating weights of signals, and determining the difference between the first beamforming result and the third beamforming result comprises:

determining a matrix difference between the first matrix and the third matrix;

determining a matrix norm of the matrix difference; and determining the matrix norm as the difference between the first beamforming result and the third beamforming result.

8. The method according to claim 1, further comprising:

determining that a change of position of the STA meets a predetermined condition based on multiple beamforming results on multiple links; and skipping beamforming processes on remaining links.

9. The method according to claim 1, further comprising:

determining that a change of position of the STA meets a predetermined condition based on a first beamforming result of the first beamforming process; and skipping the negotiation of the second TWT service period on the second link.

10. The method according to claim 9, wherein negotiating, by the AP with the STA, the second TWT service period on the second link based on the second time interval and the first TWT service period comprises:

determining that the change of position of the STA does not meet the predetermined condition based on the first beamforming result of the first beamforming process; and negotiating, with the STA, the second TWT service period on the second link based on the second time interval and the first TWT service period.

11. An access point (AP) comprising:

at least one processor; and a memory coupled to the at least one processor, the memory storing instructions to cause the at least one processor to:

determine, a first time interval for performing beamforming on a first link with a station (STA) and a second time interval for performing beamforming on a second link with the STA;

negotiate, with the STA, a first target wake time (TWT) service period on the first link based on the first time interval;

negotiate, with the STA, a second TWT service period on the second link based on the second time interval and the first TWT service period;

perform a first beamforming process on the first link during the first TWT service period; and perform a second beamforming process on the second link during the second TWT service period.

12. The AP according to claim 11, wherein the instructions to negotiate, with the STA, the second TWT service period on the second link based on the second time interval and the first TWT service period comprise instructions to:

determine a first trigger time and a first duration of the first TWT service period; and determine a second trigger time and a second duration of the second TWT service period based on the first trigger time, the first duration and the second time interval, wherein the second TWT service period does not overlap with the first TWT service period.

13. The AP according to claim 12, wherein the first time interval equals to the second time interval, the first duration is less than the first time interval and the second time interval, and the instructions to determine the second trigger time and the second duration of the second TWT service period based on the first trigger time, the first duration and the second time interval comprise instructions to:

obtain a number of links for the STA;

determine a time offset based on the number of links and the second time interval;

determine the second trigger time based on the first trigger time and the time offset; and determine the second duration of the second TWT service period based on the second time interval.

14. The AP according to claim 11, wherein the memory further stores instructions to cause the at least one processor to:

determine that a change of position of the STA meets a predetermined condition based on a first beamforming result of the first beamforming process; and skip the second beamforming process on the second link.

15. The AP according to claim 14, wherein the instructions to perform the second beamforming process on the second link during the second TWT service period comprise instructions to:

determine that the change of position of the STA does not meet the predetermined condition based on the first beamforming result of the first beamforming process; and perform the second beamforming process on the second link during the second TWT service period.

16. The AP according to claim 14, wherein the instructions to determine that the change of position of the STA meets the predetermined condition based on the first beamforming result of the first beamforming process comprise instructions to:

obtain a third beamforming result of a previous beamforming process on the first link;

determine a difference between the first beamforming result and the third beamforming result; and determine that the change of position of the STA meets the predetermined condition in response to the difference being less than a threshold value.

17. The AP according to claim 16, wherein the first beamforming result is a first matrix, the third beamforming result is a third matrix, each of the first matrix and the third matrix is generated based on a channel state matrix indicating channel states and a beamforming matrix indicating weights of signals, and the instructions to determine the difference between the first beamforming result and the third beamforming result comprise instructions to:

determine a matrix difference between the first matrix and the third matrix;

determine a matrix norm of the matrix difference; and determine the matrix norm as the difference between the first beamforming result and the third beamforming result.

18. The AP according to claim 11, wherein the memory further stores instructions to cause the at least one processor to:

determine that a change of position of the STA meets a predetermined condition based on multiple beamforming results on multiple links; and skip beamforming processes on remaining links.

19. A non-transitory computer-readable medium comprising instructions stored thereon which, when executed by an access point (AP), cause the AP to:

determine, a first time interval for performing beamforming on a first link with a station (STA) and a second time interval for performing beamforming on a second link with the STA;

negotiate, with the STA, a first target wake time (TWT) service period on the first link based on the first time interval;

negotiate, with the STA, a second TWT service period on the second link based on the second time interval and the first TWT service period;

perform a first beamforming process on the first link during the first TWT service period; and perform a second beamforming process on the second link during the second TWT service period.

* * * * *